INVENTOR.
JOACHIM HERRMANN
BY
Robert H. Jacob
AG'T.

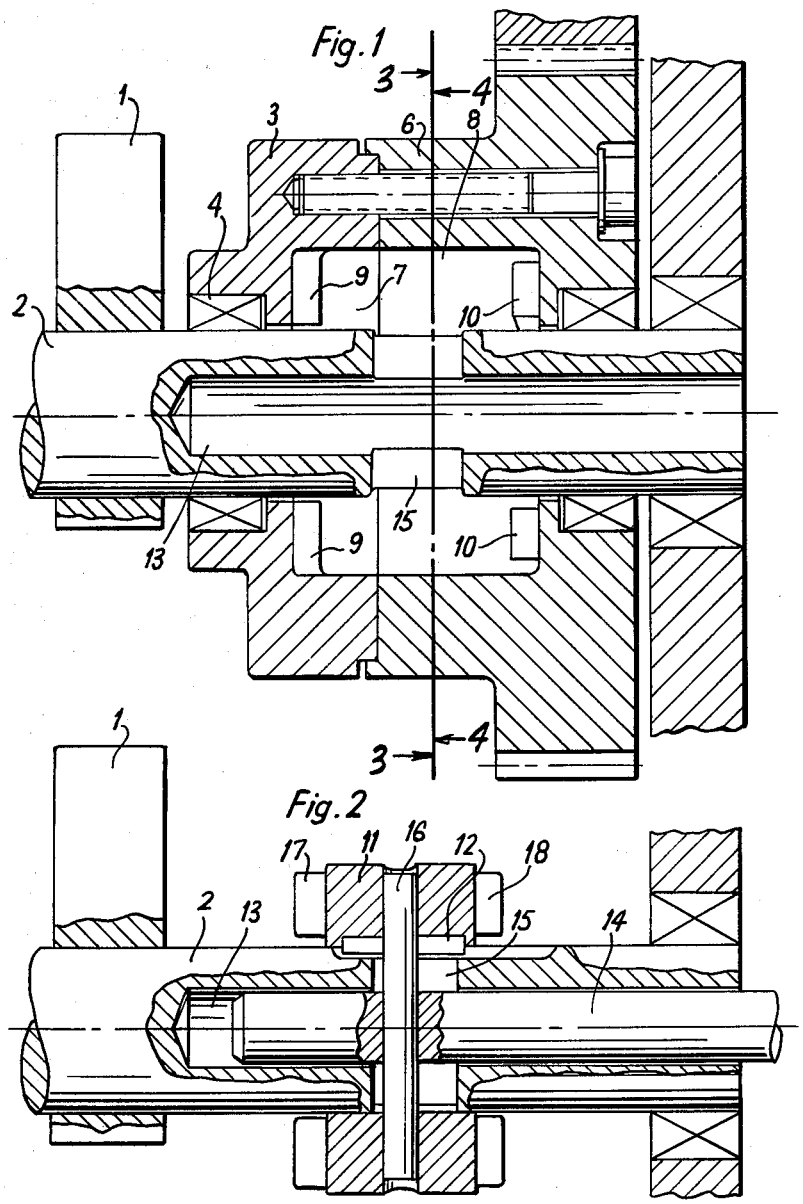

United States Patent Office 3,262,329
Patented July 26, 1966

3,262,329
MEANS FOR SHIFTING THE DIRECTION OF VI-
BRATIONS IN GROUND TAMPING PLATES OR
THE LIKE
Joachim Herrmann, Munich, Germany, assignor to Her-
mann Wacker and Peter Wacker, Munich, Germany
Filed Feb. 6, 1964, Ser. No. 343,024
Claims priority, application Germany, Feb. 9, 1963,
W 33,867
6 Claims. (Cl. 74—61)

The invention relates generally to ground tamping apparatus. More in particular, the invention provides improvements in means for changing the direction of the vibrations of ground tamping plates equipped with unbalanced weights or eccentrics which rotate in opposite directions by rotary displacement of the eccentrics relative to one another.

The adjusting of the direction of vibration of vibrating or jarring plates during operation is required, for example, for steering and/or for effecting the forward or return movement of the device or machine.

Numerous solutions of the structural problem of adjusting the direction component have become known which involve essentially devices for changing the phase relationship of two unbalanced members or eccentrics that rotate on parallel shafts.

For example, an automatically moving tamping apparatus for compressing the ground is equipped with a gear coupling which consists of a pair of non-meshing main gears for the eccentrics and a pair of meshing auxiliary gears where the auxiliary gears for adjusting the phase position are pivotally supported.

In a different embodiment of a plate vibrator the phase position of the oppositely rotating eccentrics is adjustable by means of meshing sets of gears and axially adjustable toothed gears.

These reversing mechanisms which are in the form of complicated shifting gears are relatively expensive to construct, are very sensitive to the rugged conditions prevailing at the building sites and are therefore rather susceptible to breakdown.

It is, therefore, an object of the invention to provide in lieu of these high precision gear units a robust shifting unit of simple construction that affords convenient setting of the phase position of the eccentrics.

In accordance with the invention a shifting ring having coupling prongs and slide prongs connected to a shifting shaft is provided inside a shift box or housing defined by oppositely disposed bores in a driven toothed gear and in a shifting disk, which ring is mounted for axial displacement upon the eccentric carrying or unbalanced shaft in a manner that a phase displacement of 180° can be obtained for one eccentric relative to the other. The shifting ring on the eccentric carrying hollow shaft is guided for axial displacement on the unbalanced shaft by means of fitted springs or by means of a multi-wedge key and secured against rotary movement.

The axial setting of the shifting ring on the unbalanced shaft is effected by a shifting shaft arranged concentrically in an axial bore of the unbalanced shaft and rigidly connected with the shifting ring by means of a diametrically disposed bolt.

In order to permit the axial shifting movement of the shifting shaft and of the shifting ring to which it is connected by the bolt, the unbalanced hollow shaft has a slot of a length corresponding at least to the maximum shifting path.

Two prongs or claws are provided on one side of the shifting ring which releasably engage the shifting disk which is mounted upon the hollow shaft for independent rotational movement relative thereto. The synchronous rotation of the unbalanced hollow shaft relative to the source of driving power is made possible merely by the rigid connection of the shifting disk with the shifting ring.

In order to displace the phase position of the eccentric the shifting shaft is withdrawn in axial direction, thereby causing the claws of the shifting ring to disengage the coupling grooves of the shifting disk.

While the driven toothed gear and the shifting disk which is rigidly connected thereto continue unimpededly to rotate, the unbalanced shaft which upon being uncoupled is no longer driven is subjected to a delay which is of such magnitude that the eccentric body on the unbalanced shaft falls back by an angle of 180° of the eccentric on the drive shaft, i.e., a phase displacement of that magnitude takes place between the two eccentrics.

On the side of the shifting ring opposite to the coupling claws, rising prongs are provided which after uncoupling of the shifting ring from the shifting disk contact the surface of the bore in the toothed gear and after a predetermined angular rotation of the shifting housing or box slide on the sliding cams arranged in the bore of the toothed gear. The incline of the sliding cams forces the shifting ring during the course of rotation of the shifting box back against the shifting disk and after an angle of rotation of 180° again engages the coupling members of the disk.

Further details and advantageous features of the invention will become apparent from the following specification with reference to the accompanying drawings in which FIG. 1 illustrates an axial section of the shifting box journalled on the hollow unbalanced shaft and of the transverse and longitudinal slots in the unbalanced hollow shaft, FIG. 2 shows the shifting ring with its shifting shaft mounted on the hollow shaft without the box or housing, FIG. 3 is a sectional view taken along line 3—3 in FIG. 1;

Figure 4:
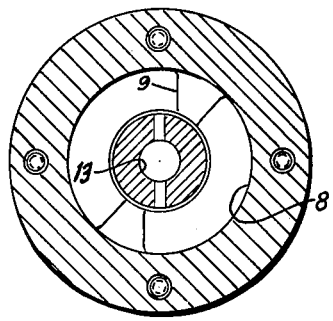
FIG. 4 is a sectional view taken along line 4—4 in FIG. 1.

As shown in FIG. 1, the shifting means in accordance with the invention comprises a partly hollow unbalanced shaft 2 supporting the eccentric 1 and on which a shifting disk 3 is rotatably mounted in bearing 4. The shifting disk 3 is rigidly connected to the toothed gear 6 which is likewise rotatably journalled on the hollow part of shaft 2 which is driven by a gear 5.

The shifting disk 3 and the toothed gear 6 which are connected with one another constitute the shifting box formed by turned hollows or bores 7 and 8 in the opposite surfaces of the shifting disk 3 and the toothed gear 6. The turned hollow 7 in the shifting disk 3 has preferably two projections or prongs 9 extending from its bottom surface. The bottom surface of the bore or hollow 8 is preferably provided with two slide cams 10 oppositely disposed therein.

FIG. 2 shows the unbalanced shaft 2 with the eccentric member 1 and a shifting ring 11 provided upon the unbalanced shaft which is secured against rotation by means of fitted springs or multi-wedge keys 12.

The unbalanced shaft 2 has an axial bore 13 in which a control shaft 14 is axially movable. Furthermore a slot 15 is provided in the hollow portion of shaft 2 in the region of the axial bore 13. The shifting ring 11 is rigidly connected with the control shaft 14 by means of a bolt 16 which extends through the slot 15. The side of the shifting ring 11 which faces the shifting disk 3 is provided with coupling prongs or claws 17 and the side which faces the toothed gear 6 is provided with prongs or sliding cam follower 18.

Figure 6:
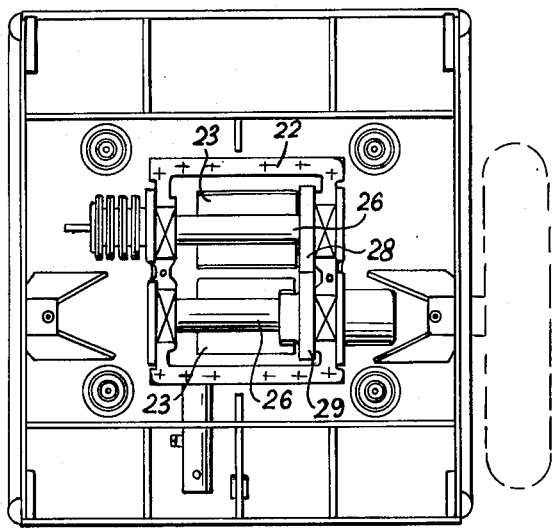
FIG. 6 is a top view of the machine in accordance with FIG. 5 with the cover removed to expose the eccentric shafts.
Figure 3:
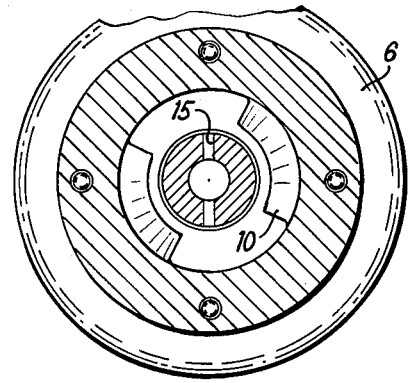
Figure 5:
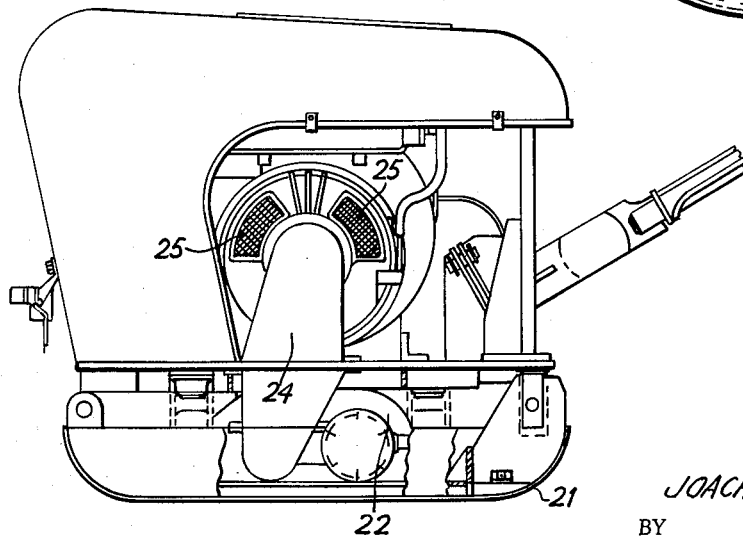
FIG. 5 illustrates a tamping machine incorporating the principle of the invention to provide for forward and reverse movement.

The tamping machine in accordance with FIGS. 5 and 6 has a tamping plate 1 above which the eccentric shafts 26 are supported for rotation in a housing 22. The motor 25 drives one of the two shafts 26 by means of V belts arranged behind the shield 24 and the driven shaft drives the other shaft in synchronism by way of meshing gears 28, 29. Each shaft 26 is associated with an eccentric 23. The specific arrangement of the eccentrics shown in FIGS. 5 and 6 differs in details from that shown in FIGS. 1 and 2, but the operating principle is the same.

The operation of the machine is best understood with reference to FIGS. 1 and 2. In the normal position the coupling claws 17 engage the projections 9 on the shifting disk 3. The shifting ring 11 is only axially movable and not rotatable on the shaft 2. The disk 3 and gear 6 are rigidly connected with each other and are rotatable on shaft 2. The force required for moving the eccentric shaft 2 thus is transmitted by toothed gear 5 to driven gear 6, shifting disk 3, ring 11, springs or keys 12 and onto the shaft.

If the coupling claw 17 is withdrawn from the projections or lugs 9 the gear 6 and disk 3 continue to rotate unimpededly. No force is transmitted to the eccentric shaft 2, but owing to the drag of inertia caused by the mass it is retarded. As the claws 17 are withdrawn from the projections 9 the sliding cam followers 18 engage the slide cams 10 which are in the form of a rising track. This track is designed in a manner that after the gear 6 has advanced 180° ahead of the eccentric shaft 2 and as the sliding cam follower 18 slides off the track 10 the coupling claws 17 again engage the projections 9. Thus the eccentric shaft has lagged 180° behind the other eccentric shaft to which the driving force is applied, so that a phase displacement of 180° is obtained. As a result the vibrating plate is moved in the opposite direction.

The control shaft 14 which is rigidly connected to the shifting ring 11 is operated from the outside by a Bowden cable which effects the axial displacement.

Having now described my invention with reference to the embodiment illustrated in the drawings, I do not wish to be limited thereto, but what I desire to protect by Letters Patent of the United States is set forth in the appended claims.

I claim:

1. Means for changing the direction of vibration of rotating eccentric bodies comprising a pair of eccentric bodies each mounted on a shaft, said shafts being adapted for use in ground tamping equipment and extending parallel to each other, said means including a shifting ring mounted in a shift housing on one said shaft, said shift housing comprising a driven gear and a shifting disk rotatably mounted on said one shaft and each provided with a bore, said shifting disk presenting a pair of prongs in its bore and said driven gear presenting a pair of slide cams in its bore, said shifting ring having a pair of claws on one side thereof for engagement with said prongs and having a pair of sliding cam followers on the other side thereof for engagement with said slide cams, and said shifting ring being mounted for sliding movement on said one shaft to alternately engage said prongs with said claws and said sliding cam followers with said slide cams.

2. Means for changing the direction of vibration of rotating eccentric bodies comprising a pair of eccentric bodies each mounted on a shaft, said shafts being adapted for use in ground tamping equipment and extending parallel to each other, said means including a shifting ring mounted in a shift housing on one said shaft, said shift housing comprising a driven gear and a shifting disk rotatably mounted on said one shaft ad each provided with a bore, said shifting disk presenting a pair of prongs in its bore and said driven gear presenting a pair of slide cams in its bore, said shifting ring having a pair of claws on one side thereof for engagement with said prongs and having a pair of sliding cam folllowers on the other side thereof for engagement with said slide cams, and said shifting ring being mounted for sliding movement on said one shaft to alternately engage said prongs with said claws and said sliding cam followers with said slide cams, said one shaft having a hollow shaft portion and an elongated control shaft being disposed in said hollow shaft portion and rigidly connected to said shifting ring.

3. Means for changing the direction of vibration of rotating eccentric bodies comprising a pair of eccentric bodies each mounted on a shaft, said shafts being adapted for use in ground tamping equipment and extending parallel to each other, said means including a shifting ring mounted in a shift housing on one said shaft, said shift housing comprising a driven gear and a shifting disk rotatably mounted on said one shaft and each provided with a bore, said shifting disk presenting a pair of prongs in its bore and said driven gear presenting a pair of slide cams in its bore, said shifting ring having a pair of claws on one side thereof for engagement with said prongs and having a pair of sliding cam followers on the other side thereof for engagement with said slide cams, said shifting ring being mounted for sliding movement on said one shaft to alternately engage said prongs with said claws and said sliding cam followers with said slide cams, said one shaft having a hollow shaft portion and an elongated control shaft being disposed in said hollow shaft portion and rigidly connected to said shifting ring, said hollow shaft portion having a slot proximate said ring and a bolt extending between said ring and said control shaft.

4. Means for changing the direction of vibration of rotating eccentric bodies comprising a pair of eccentric bodies each mounted on a shaft, said shafts being adapted for use in ground tamping equipment and extending parallel to each other, said means including a shifting ring mounted in a shift housing on one said shaft, said shift housing comprising a driven gear and a shifting disk rotatably mounted on said one shaft and each provided with a bore, said shifting disk presenting a pair of prongs in its bore and said driven gear presenting a pair of slide cams in its bore, said shifting ring having a pair of claws on one side thereof for engagement with said prongs and having a pair of sliding cam followers on the other side thereof for engagement with said slide cams, said shifting ring being mounted for sliding movement on said one shift to alternately engage said prongs with said claws and said sliding cam followers with said slide cams, said one shaft having a hollow shaft portion and an elongated control shaft being disposed in said hollow shaft portion and rigidly connected to said shifting ring, said hollow shaft portion having a slot proximate said ring and a bolt extending between said ring and said control shaft, said ring, said hollow shaft portion, said control shaft and the eccentric associated therewith being angularly movable relative to said shifting disk and said driven gear.

5. The means in accordance with claim 4 wherein fitted springs are provided to secure said shifting ring against rotational movement on said hollow shaft portion.

6. The means in accordance with claim 4 wherein wedge keys are provided intermediate said hollow shaft portion and said shifting ring to secure said ring against rotational movement on said hollow shaft portion.

References Cited by the Examiner
UNITED STATES PATENTS

| | | | |
|---|---|---|---|
| 2,725,745 | 12/1955 | Hubbard et al. | 74—87 X |
| 2,892,353 | 6/1959 | Harshberger | 74—61 |
| 3,192,839 | 7/1965 | Vivier | 74—87 X |

FRED C. MATTERN, Jr., *Primary Examiner.*

F. E. BAKER, *Assistant Examiner.*